(12) United States Patent
Kimura

(10) Patent No.: US 12,458,207 B2
(45) Date of Patent: Nov. 4, 2025

(54) ENDOSCOPIC EXAMINATION SUPPORT DEVICE, ENDOSCOPIC EXAMINATION SUPPORT METHOD, AND ENDOSCOPIC EXAMINATION SUPPORT PROGRAM

(71) Applicant: FUJIFILM Corporation, Tokyo (JP)

(72) Inventor: Yuya Kimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 603 days.

(21) Appl. No.: 17/812,042

(22) Filed: Jul. 12, 2022

(65) Prior Publication Data
US 2022/0338717 A1 Oct. 27, 2022

Related U.S. Application Data

(63) Continuation of application No. PCT/JP2021/000927, filed on Jan. 13, 2021.

(30) Foreign Application Priority Data

Feb. 27, 2020 (JP) ................. 2020-032313

(51) Int. Cl.
*A61B 1/00* (2006.01)
*A61B 1/05* (2006.01)
*G06T 7/00* (2017.01)

(52) U.S. Cl.
CPC ............ *A61B 1/00009* (2013.01); *A61B 1/05* (2013.01); *G06T 7/0012* (2013.01); *G06T 2207/10004* (2013.01); *G06T 2207/10068* (2013.01)

(58) Field of Classification Search
CPC . A61B 1/00009; A61B 1/000095; A61B 1/05; G06T 2207/10004; G06T 2207/10068; G06T 7/0012
See application file for complete search history.

(56) References Cited

U.S. PATENT DOCUMENTS

2005/0234326 A1\* 10/2005 Uchikubo ............... A61B 90/36
  600/407
2009/0009595 A1\* 1/2009 Ishiwata ............... A61B 5/0075
  348/E7.085

(Continued)

FOREIGN PATENT DOCUMENTS

CN  105637402 A   6/2016
JP  2006280592 A  * 10/2006
(Continued)

OTHER PUBLICATIONS

Tobias Bergen et al., "Stitching and Surface Reconstruction From Endoscopic Image Sequences: A Review of Applications and Methods," Dec. 31, 2015, IEEE Journal of Biomedical and Health Informatics, vol. 20, No. 1, Jan. 2016,pp. 304-316.*

(Continued)

*Primary Examiner* — Omar S Ismail
(74) *Attorney, Agent, or Firm* — Studebaker Brackett PLLC

(57) ABSTRACT

An endoscopic examination support device stores, in a memory, a plurality of pieces of captured image data obtained by a plurality of imagings by an endoscope in a state in which the endoscope is inserted into a subject, and treatment information indicating treatment performed by using the endoscope in the state. Moreover, the endoscopic examination support device generates, based on the stored plurality of pieces of captured image data and treatment information, a large intestine developed image of an inside of the subject obtained by synthesizing the plurality of pieces of captured image data, the large intestine developed image being added with biopsy position mark indicating a position in the subject at which the treatment is performed, and displays the generated large intestine developed image on a display device.

15 Claims, 9 Drawing Sheets

(56) References Cited

U.S. PATENT DOCUMENTS

| | | | | |
|---|---|---|---|---|
| 2009/0010507 | A1* | 1/2009 | Geng | G06T 7/593 |
| | | | | 382/128 |
| 2009/0207241 | A1* | 8/2009 | Igarashi | G06T 7/55 |
| | | | | 348/E7.086 |
| 2009/0234223 | A1* | 9/2009 | Onoda | A61B 5/06 |
| | | | | 600/117 |
| 2016/0000520 | A1* | 1/2016 | Lachmanovich | A61B 34/20 |
| | | | | 600/424 |
| 2016/0073927 | A1 | 3/2016 | Akimoto et al. | |
| 2016/0225168 | A1* | 8/2016 | Sato | G02B 23/2484 |
| 2018/0060524 | A1* | 3/2018 | Krimsky | G16H 50/30 |
| 2019/0274520 | A1* | 9/2019 | Fujita | A61B 1/00131 |
| 2020/0183066 | A1* | 6/2020 | Mitani | G03B 5/00 |
| 2021/0207942 | A1* | 7/2021 | Winkelmann, Jr. | |
| | | | | G01B 9/02091 |
| 2022/0222773 | A1* | 7/2022 | Miyata | G06T 3/40 |

FOREIGN PATENT DOCUMENTS

| | | | |
|---|---|---|---|
| JP | 2016-043033 A | | 4/2016 |
| JP | 2017086685 A | * | 5/2017 |
| JP | 2017-528175 A | | 9/2017 |
| JP | 2017-205343 A | | 11/2017 |
| WO | WO-2018096680 A1 | * | 5/2018 ......... A61B 1/00043 |

OTHER PUBLICATIONS

Jianyu Lin et al., "Dual-modality endoscopic probe for tissue surface shape reconstruction and hyperspectral imaging enabled by deep neural networks," Jul. 15, 2018, Medical Image Analysis 48 (2018),pp. 162-174.*

Alexander V. Mamonov et al., "Automated Polyp Detection in Colon Capsule Endoscopy," Jun. 27, 2014, IEEE Transactions on Medical Imaging, vol. 33, No. 7, Jul. 2014,pp. 1488-1501.*

Xiao Jia et al., "Wireless Capsule Endoscopy: A New Tool for Cancer Screening in the Colon With Deep-Learning-Based Polyp Recognition," Dec. 26, 2019, Proceedings of the IEEE | vol. 108, No. 1, Jan. 2020,pp. 178-190.*

Bernd Munzer et al., "Content-based processing and analysis of endoscopic images and videos: A survey," Jan. 11, 2017, Multimed Tools Appl (2018) 77,pp. 1325-1243.*

Alceu Bissoto et al., "Skin Lesion Synthesis with Generative Adversarial Networks," Oct. 2, 2018, Computer Science Computer Science (RO),vol. 11041. Springer, Cham. https://doi.org/10.1007/978-3-030-01201-4_32, pp. 295-300.*

International Search Report issued in PCT/JP2021/000927; mailed Mar. 23, 2021.

International Preliminary Report on Patentability (Chapter I) and Written Opinion of the International Searching Authority issued in PCT/JP2021/000927; issued Aug. 30, 2022.

An Office Action mailed by China National Intellectual Property Administration on Mar. 24, 2025, which corresponds to Chinese Patent Application No. 20218015801.3 and is related to U.S. Appl. No. 17/812,042; with English language translation.

* cited by examiner

FIG. 4

FUJISUKE FUJI
0123456789012345
♂ AB(+)
31 YEARS OLD (11.11.1977)
INPATIENT ABC BUILDING 301

| RESERVATION DETAILS | ORDER SEARCH LIST | INTERVIEW AND PRETREATMENT | EXAMINATION RECORD | IMAGING REGISTRATION | IMAGE DISPLAY | REPORT | PATHOLOGY | PERFORMANCE | Option |

A / B / C

| RECEPTION | CANCEL | RESERVATION REGISTRATION | RESERVATION EDITING | RESERVATION DELETION | CALL | RELEASE |

| RECEPTION TIME PRINTING | LIST PRINTING | FILE OUTPUT |  C1

| VISIT | RECEPTION | EXAMINATION COUNTING | PATIENT ID | PATIENT NAME | DATE OF BIRTH | AGE | GENDER | ORDER NUMBER | SCHEDULED DATE | SCHEDULED TIME POINT | INPATIENT/OUTPATIENT CLASSIFICATION | EXAMINATION ITEM |
|---|---|---|---|---|---|---|---|---|---|---|---|---|
| ○ | ○ | ○ | 12345678901234 | FUJISUKE FUJI | 11/11/1977 | 31 | MALE | 11111112222 | 12/11/2008 | 11:30 | INPATIENT | UPPER PART |
| ○ | ○ | ○ | 12345678901235 | FUJIO FUJI | 12/12/1985 | 23 | MALE | 11111112222 | 12/11/2008 | 12:00 | OUTPATIENT | UPPER PART |
|   |   |   | 12345678901236 | FUJIO FUJI | 12/12/1985 | 23 | MALE | 11111113333 | 12/13/2008 | 16:40 | OUTPATIENT | LOWER PART |
|   |   |   | 12345678901237 | FUJIKO FUJI | 12/12/1985 | 23 | FEMALE | 1112345611 | 12/12/2008 | 09:30 | OUTPATIENT | UPPER PART |
|   |   |   | 12345678901238 | MASAHARU FUJIYAMA | 02/06/1969 | 39 | MALE | 111112345611 | 12/12/2008 | 12:50 | INPATIENT | UPPER PART |
|   |   |   | 12345678901239 | FUSHIMI FUJI | 12/12/1985 | 23 | FEMALE | 11111142215 | 12/14/2008 | 10:30 | INPATIENT | BRONCHUS |

LOG-IN PARTY: ABCDEFGHIJ    LOG OUT

ENDOSCOPIC EXAMINATION SUPPORT DEVICE, ENDOSCOPIC EXAMINATION SUPPORT METHOD, AND ENDOSCOPIC EXAMINATION SUPPORT PROGRAM

CROSS REFERENCE TO RELATED APPLICATION

This is a continuation of International Application No. PCT/JP2021/000927 filed on Jan. 13, 2021, and claims priority from Japanese Patent Application No. 2020-032313 filed on Feb. 27, 2020, the entire disclosures of which are incorporated herein by reference.

BACKGROUND OF THE INVENTION

1. Field of the Invention

The present invention relates to an endoscopic examination support device, an endoscopic examination support method, and a computer readable medium storing an endoscopic examination support program which support an examination by an endoscope.

2. Description of the Related Art

In the related art, there is known a configuration in which an image obtained by an endoscope is displayed in association with an imaging time point during an examination by an endoscope. For example, JP2017-86685A discloses a configuration in which an examination transition screen is generated in which events extracted due to a change in a state value of examination data are arranged in time series.

In addition, JP2016-43033A discloses a configuration in which a developed image virtually representing a state in which a luminal organ is cut open along an extension direction and is developed is generated from a plurality of endoscopic images obtained by imaging an inner surface of the luminal organ.

In addition, JP2006-280592A discloses a configuration in which a source coil is provided on biopsy forceps as a treatment tool and a biopsy position is recorded with an ON state of a biopsy operation signal as a trigger to automatically record a position at which the biopsy is performed in a desired examination region in a body cavity.

SUMMARY OF THE INVENTION

However, in the related art, it is not possible to easily grasp a position at which the treatment, such as the biopsy, is performed in the endoscopic examination. In particular, since it is difficult to determine an observation site on an inner surface of a large intestine only from the image, it is difficult to grasp a position in the large intestine at which the treatment, such as the biopsy, is performed.

For example, in the configuration in which the examination transition screen is displayed in which the extracted events are arranged in time series as in JP2017-86685A, a timing at which the treatment, such as the biopsy, is performed can be grasped, but it is not easy to grasp a position at which the treatment, such as the biopsy, is performed.

In addition, in the configuration in which the developed image of the luminal organ is generated as in JP2016-43033A, a state of the inner surface of the luminal organ can be grasped, but the position at which the treatment, such as the biopsy, is performed cannot be grasped.

In addition, the means for solving the problems described above is not disclosed in JP2006-280592A.

The present invention has been made in view of the above circumstances, and is to provide an endoscopic examination support device, an endoscopic examination support method, and a computer readable medium storing an endoscopic examination support program which enable to easily grasp a position at which treatment is performed in an endoscopic examination.

An aspect of the present invention relates to an endoscopic examination support device comprising a processor, and a memory, in which the memory stores a plurality of pieces of captured image data obtained by a plurality of imagings by an endoscope in a state in which the endoscope is inserted into a subject, and treatment information indicating treatment performed by using the endoscope in the state, and the processor configured to generate, based on the plurality of pieces of captured image data and the treatment information, a developed image of an inside of the subject obtained by synthesizing the plurality of pieces of captured image data, the developed image being added with information indicating a position in the subject at which the treatment is performed, and display the generated developed image on a display device.

Another aspect of the present invention relates to an endoscopic examination support method comprising storing a plurality of pieces of captured image data obtained by a plurality of imagings by an endoscope in a state in which the endoscope is inserted into a subject, and treatment information indicating treatment performed by using the endoscope in the state, generating, based on the plurality of pieces of captured image data and the treatment information, a developed image of an inside of the subject obtained by synthesizing the plurality of pieces of captured image data, the developed image being added with information indicating a position in the subject at which the treatment is performed, and displaying the generated developed image on a display device.

Still another aspect of the present invention relates to a non-transitory computer readable medium storing an endoscopic examination support program causing a computer to execute a process comprising storing a plurality of pieces of captured image data obtained by a plurality of imagings by an endoscope in a state in which the endoscope is inserted into a subject, and treatment information indicating treatment performed by using the endoscope in the state, generating, based on the plurality of pieces of captured image data and the treatment information, a developed image of an inside of the subject obtained by synthesizing the plurality of pieces of captured image data, the developed image being added with information indicating a position in the subject at which the treatment is performed, and displaying the generated developed image on a display device.

According to the present invention, it is possible to provide the endoscopic examination support device, the endoscopic examination support method, and the computer readable medium storing the endoscopic examination support program which enable to easily grasp the position at which the treatment is performed in the endoscopic examination.

BRIEF DESCRIPTION OF THE DRAWINGS

FIG. 4 is a diagram showing an example of a basic screen of an application of the client PC 22.

DESCRIPTION OF THE PREFERRED EMBODIMENTS

In the following, an embodiment of the present invention will be described with reference to the drawings.

Example of Embodiment

Figure 1:
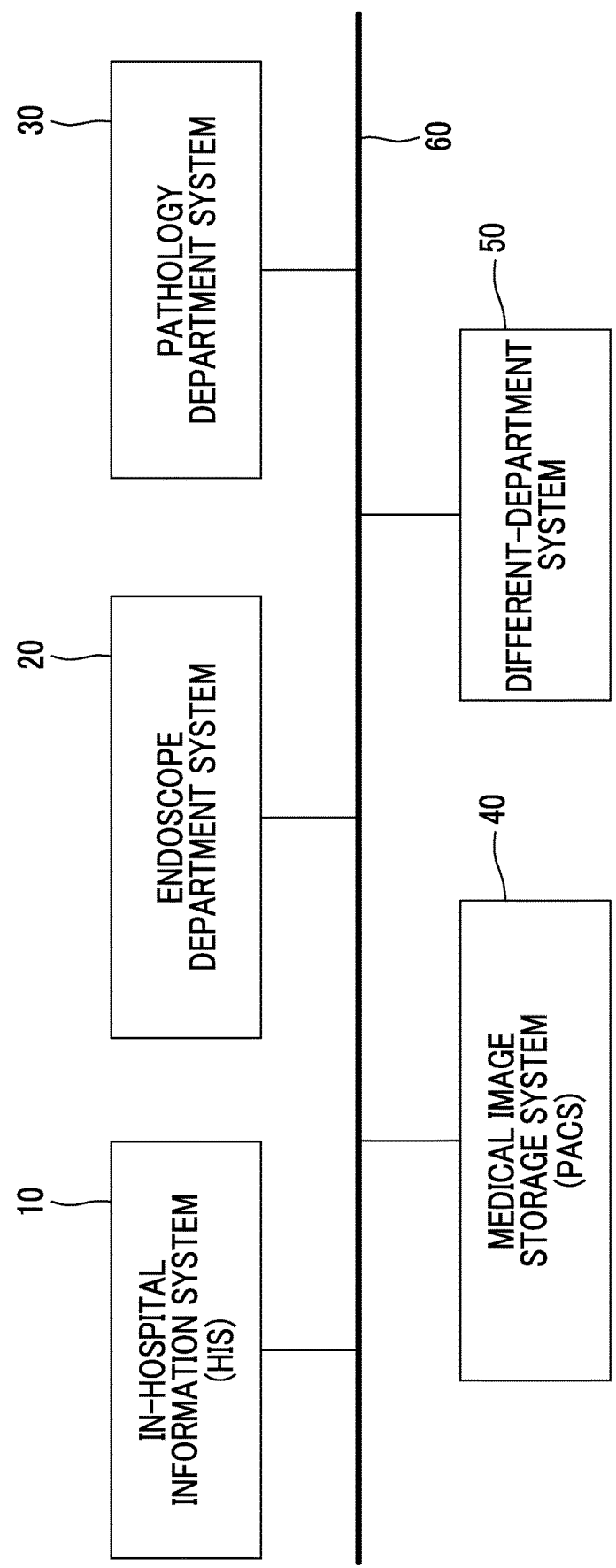
FIG. 1 is a diagram showing an example of an overall configuration of an in-hospital system.

FIG. 1 is a diagram showing an example of an overall configuration of an in-hospital system. The system shown in FIG. 1 comprises a hospital information system (HIS) 10, an endoscope department system 20, a pathology department system 30, a medical image storage system 40, and a different-department system 50. The HIS 10, the endoscope department system 20, the pathology department system 30, the medical image storage system 40, and the different-department system 50 are connected to an in-hospital local area network (LAN) 60 and can cooperate with each other.

The HIS 10 is a comprehensive system including a medical office accounting system, a medical care reservation system, a medical care information system, and the like, and includes an electronic medical record database and the like. The electronic medical record database stores an electronic medical record that records medical care information of a patient.

In a case in which information (hereinafter referred to as examination request information) related to an examination request (order) in a case in which the examination request is made to an endoscope department from other medical care departments is issued, the information is transmitted to the endoscope department system 20 via the HIS 10.

Examples of the examination request information include patient information, order key information ("order number", "date and time of occurrence", and the like), request source information ("request department name", "request doctor name", and the like), order information ("request disease name", "examination purpose", "examination type", "examination item", "examination site", "comment", and the like), and examination reservation information ("examination date", "performance time point", and the like). The patient information is information related to the patient and includes patient-peculiar information, such as "patient ID", "patient name", "date of birth", "age", "gender", and "inpatient/outpatient classification".

The endoscope department system 20 is a system that manages the endoscope department.

The pathology department system 30 is a system that manages a pathology department.

The medical image storage system 40 is a system that electronically stores, searches for, and analyzes an examination image from a medical image diagnosis device, such as an endoscope apparatus, a computed tomography (CT), and a magnetic resonance imaging (MRI). The medical image storage system 40 may be, for example, a picture archiving and communication systems (PACS) or may be another system capable of storing a medical image.

The different-department system 50 is a system that manages other departments.

Figure 2:
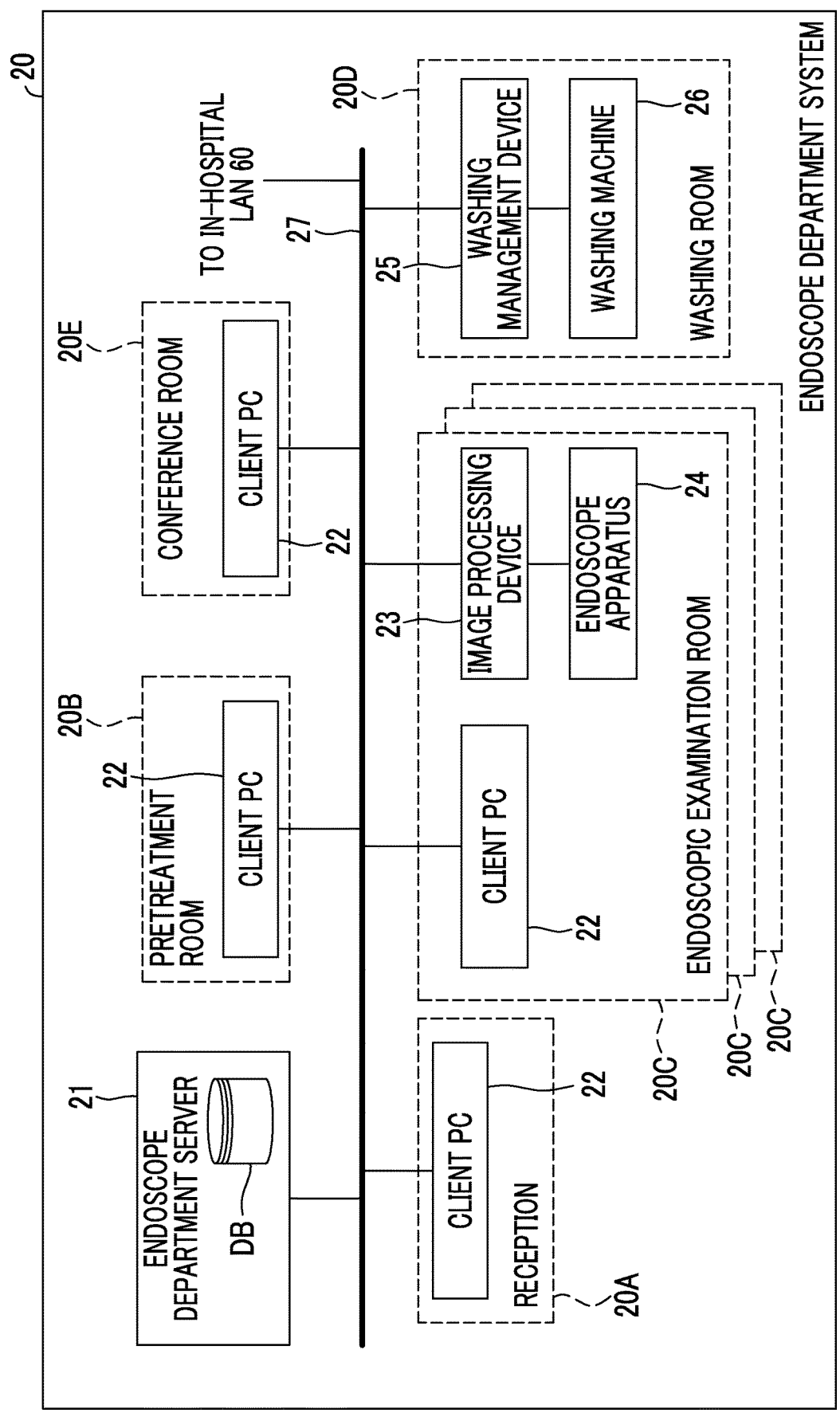
FIG. 2 is a diagram showing a schematic configuration of an endoscope department system 20 in the system shown in FIG. 1.

FIG. 2 is a diagram showing a schematic configuration of the endoscope department system 20 in the system shown in FIG. 1. The endoscope department includes a reception 20A, a pretreatment room 20B, a plurality of endoscopic examination rooms (hereinafter referred to as examination rooms) 20C, a washing room 20D, and a conference room 20E.

The reception 20A is a place at which the reception of the examination is made. The pretreatment room 20B is a room in which an interview and a pretreatment are performed before the endoscopic examination. The examination room 20C is a room in which the endoscopic examination is performed. The washing room 20D is a room in which a scope and the like used for the endoscopic examination is washed.

The endoscope department system 20 shown in FIG. 2 comprises an endoscope department server 21, a plurality of client personal computers (PCs) 22, an image processing device 23, an endoscope apparatus 24, a washing management device 25, and a washing machine 26. The endoscope department server 21, the plurality of client PCs 22, the image processing device 23, and the washing management device 25 are connected to an in-department LAN 27. The in-department LAN 27 is connected to the in-hospital LAN 60. The endoscopic examination support device according to the embodiment of the present invention can be applied, as an example, to the image processing device 23.

The endoscope apparatus 24 comprises an insertion part (scope) having an imaging element at a distal end thereof, and inputs continuous captured image data obtained by continuous imaging by the imaging element to the image processing device 23. A configuration example of the endoscope apparatus 24 will be described below in FIG. 5.

The image processing device 23 is connected to the endoscope apparatus 24 in the examination room 20C in which the image processing device 23 is installed. The captured image data obtained by continuous imaging by the endoscope apparatus 24 are continuously input to the image processing device 23. The image processing device 23 generates a still image based on the captured image data that satisfies a specific condition among the captured image data continuously input from the endoscope apparatus 24.

Specifically, the image processing device 23 performs analysis by artificial intelligence (AI) based on the captured image data input from the endoscope apparatus 24. Moreover, the image processing device 23 generates the still image based on the captured image data at a time based on a result of analysis among the captured image data continuously input from the endoscope apparatus 24.

For example, in a case in which it is detected, by the image recognition based on the captured image data input from the endoscope apparatus 24, that the distal end of the scope of the endoscope apparatus 24 reaches a significant point (anus, ileocecal region, or the like), the image processing device 23 extracts a plurality of captured image data from the time of detection. Moreover, the image processing device 23 generates the still image for each of the extracted plurality of captured image data.

In addition, in a case in which it is detected, by the image recognition based on the captured image data input from the endoscope apparatus 24, that the treatment using the endoscope of the endoscope apparatus 24 is performed, the image processing device 23 extracts the captured image data at the time of detection. This treatment is, for example, treatment, such as the biopsy using biopsy forceps provided in the endoscope of the endoscope apparatus 24. In a case in which the biopsy is performed by using biopsy forceps, the biopsy forceps are reflected in the image of the captured image data. Therefore, the image processing device 23 can detect the biopsy using the biopsy forceps by detecting the biopsy forceps reflected in the image by the image recognition based on the captured image data.

In addition, the image processing device 23 adds, to the generated still image, imaging time point information indicating an internal time point of the image processing device 23 when the still image is obtained.

In a case in which the endoscopic examination support device according to the embodiment of the present invention is applied to the image processing device 23, the image processing device 23 stores the plurality of captured image data obtained by a plurality of imagings by the endoscope apparatus 24, and the treatment information indicating the treatment performed by using the endoscope apparatus 24. In addition, based on the stored plurality of captured image data and treatment information, the image processing device 23 generates a developed image of an inside of the subject obtained by synthesizing the plurality of captured image data, the developed image being added with information indicating the position in the subject at which the treatment is performed. Moreover, the image processing device 23 displays the generated developed image on another display device (for example, a display unit 22b of the client PC 22). These pieces of processing of the image processing device 23 will be described below.

The image processing device 23 transmits the generated still image, the imaging time point information, and the developed image to the endoscope department server 21 via the in-department LAN 27. The still image and the imaging time point information transmitted by the image processing device 23 are stored by the medical image storage system 40 shown in FIG. 1, for example, under the control of the endoscope department server 21.

The washing machine 26 and the washing management device 25 are installed in the washing room 20D. The washing machine 26 is a device that washes the scope and the like used for the endoscopic examination.

The washing management device 25 is connected to the washing machine 26, and is a computer that registers information, such as a washing history by the washing machine 26, in the endoscope department server 21.

The endoscope department server 21 is a computer that comprehensively controls the client PC 22, the image processing device 23, and the washing management device 25. The endoscope department server 21 has a built-in database DB, and various pieces of information (examination request information, examination result information, and the like) are stored in the database DB.

A predetermined application program is installed in the client PC 22, and the program enables reference and editing of data recorded in the database DB, registration of data in the database, and the like.

Figure 3:
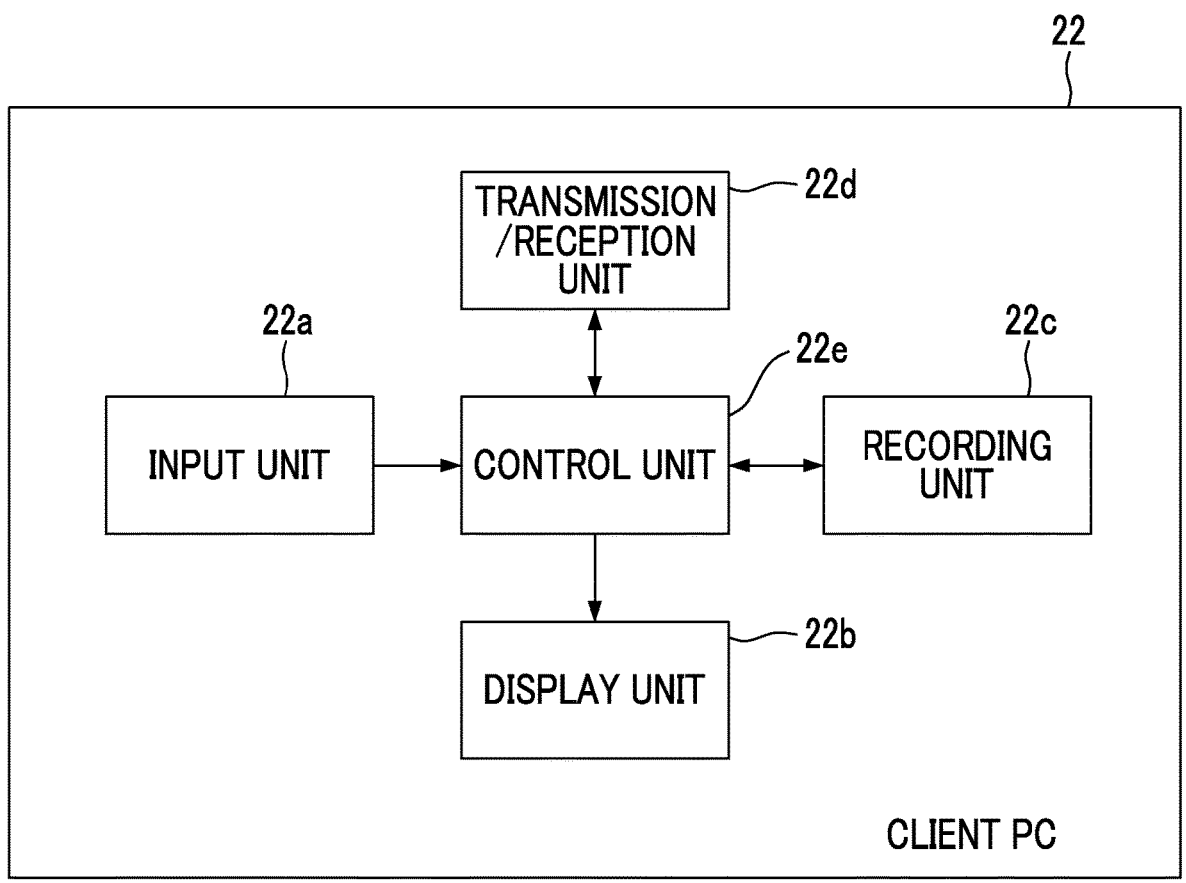
FIG. 3 is a block diagram showing an internal configuration of a client PC 22 in an endoscope department system 20 shown in FIG. 2.

FIG. 3 is a block diagram showing an internal configuration of the client PC 22 in the endoscope department system 20 shown in FIG. 2. As shown in FIG. 3, the client PC 22 is composed of an input unit 22a, the display unit 22b, a recording unit 22c, a transmission/reception unit 22d, and a control unit 22e.

The input unit 22a is an input unit that performs various inputs, and is composed of an input device, such as a keyboard and a touch panel, and a pointing device, such as a mouse and a trackball.

The display unit 22b is a display that displays various images, reports, and the like, and is composed of a liquid crystal display (LCD), a cathode ray tube (CRT), and the like.

The recording unit 22c is composed of a hard disk or the like that records various data.

The transmission/reception unit 22d is composed of a transmission/reception interface circuit and the like, and executes processing of transmitting/receiving various instructions, various requests, and various data via the in-department LAN 27.

The control unit 22e includes various processors that execute a program to perform processing, a random access memory (RAM), and a read only memory (ROM).

Examples of the various processors include a central processing unit (CPU), which is a general-purpose processor that executes the program to perform various pieces of processing, a programmable logic device (PLD), which is a processor of which the circuit configuration can be changed after the manufacture, such as a field programmable gate array (FPGA), and a dedicated electric circuit, which is a processor having the circuit configuration specially designed for executing specific processing, such as an application specific integrated circuit (ASIC).

More specifically, the structure of these various processors is an electric circuit in which circuit elements, such as semiconductor elements, are combined.

The control unit 22e may be composed of one of the various processors, or may be composed of a combination (for example, a combination of a plurality of FPGAs or a combination of a CPU and an FPGA) of two or more processors of the same type or different types.

The control unit 22e controls each unit of the client PC 22 in accordance with the program described above, various requests transmitted from an outside via the in-department LAN 27, instruction information input from the input unit 22a, and the like.

Although the internal configuration of the client PC 22 has been described, the image processing device 23 is composed of, for example, the transmission/reception unit 22d and the control unit 22e shown in FIG. 3. In this case, the image processing device 23 communicates with the endoscope apparatus 24 or the endoscope department server 21 by the transmission/reception unit 22d. In addition, the image processing device 23 analyzes the captured image data by the control unit 22e.

FIG. 4 is a diagram showing an example of a basic screen of an application of the client PC 22. In a case in which the user activates the application on the client PC 22 and logs in, the control unit 22e acquires basic screen data from the database DB and displays the basic screen shown in FIG. 4 on the display unit 22b. It should be noted that the client PC 22 is, for example, the client PC 22 in the examination room 20C, but the client PC 22 is not limited to this, and may be another client PC 22 shown in FIG. 2.

This basic screen is composed of a region A in which a list of the examination request information (partially excerpted information) is displayed, a region B in which various operation buttons are displayed, and a region C in which a valid launcher for the examination request information selected from the list of the region A is displayed.

In the list of the region A, processing items, such as "visit", "reception", "examination", and "counting" are provided for each examination request information, and an "o" mark is displayed for each processing item in a case in which the processing indicated by each processing item for the each examination request information ends.

The data for displaying the mark is registered in the database DB by the endoscope department server 21 in a case in which each processing ends. For example, in a case in which the examination based on the examination request information ends, the endoscope department server 21 registers the information indicating that the examination ends in the database DB in association with the examination request information. As a result, the "o" mark is displayed in the processing item of "examination". The information on whether or not each processing ends may be manually input, or it may be possible to automatically give a notification thereof from the client PC 22 or the endoscope apparatus 24.

The application has a button C1 of "image display" as the operation button, and the button C1 of "image display" is displayed in the region C of the basic screen shown in FIG. 4. The button C1 of "image display" is a button for displaying the captured image data obtained by the examination based on the examination request information selected from the list of the region A.

The control unit 22e of the client PC 22 periodically acquires the data for displaying the basic screen from the database DB and displays the basic screen on the display unit 22b.

Figure 5:
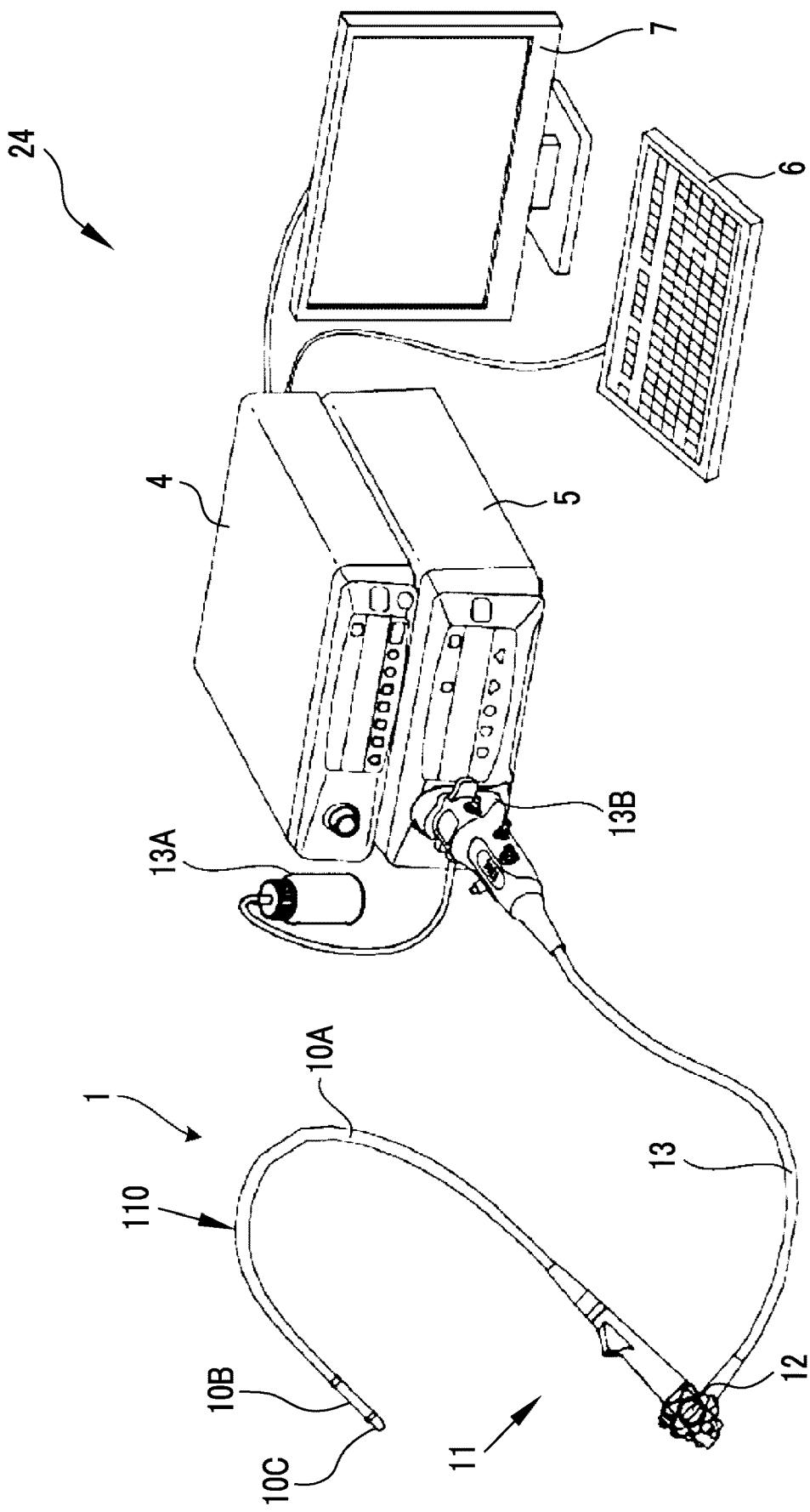
FIG. 5 is a diagram showing an example of an endoscope apparatus 24.

FIG. 5 is a diagram showing an example of the endoscope apparatus 24. As shown in FIG. 5, the endoscope apparatus 24 comprises an endoscope 1, and a control device 4 and a light source device 5 to which the endoscope 1 is connected.

A display device 7 that displays a captured image or the like obtained by imaging an inside of a subject by the endoscope 1 and an input unit 6, which is an interface for inputting various pieces of information to the control device 4 are connected to the control device 4. The control device 4 controls the endoscope 1, the light source device 5, and the display device 7.

The display device 7 has a display surface on which display pixels are two-dimensionally arranged, and pixel data constituting image data is drawn on each display pixel on the display surface, thereby performing the display of an image based on the image data. The display device 7 constitutes a display unit that switches the display image in accordance with a command from the control device 4.

The endoscope 1 includes an insertion part 110 which is a tubular member extending in one direction and is inserted into the subject, an operating part 11 which is provided in a base end part of the insertion part 110 and includes an operation member for performing an observation mode switching operation, an imaging recording operation, a forcep operation, an air supply/water supply operation, and a suction operation, an angle knob 12 provided adjacent to the operating part 11, and a universal cord 13 including connector portions 13A and 13B that detachably connect the endoscope 1 to the control device 4 and the light source device 5, respectively.

It should be noted that, although not shown in FIG. 5, various channels, such as a forcep hole for inserting the biopsy forceps for sampling a living body tissue, such as cells or polyps, an air supply/water supply channel, and a suction channel, are provided inside the operating part 11 and the insertion part 110.

The insertion part 110 is composed of a flexible part 10A having flexibility, a bendable part 10B provided at a distal end of the flexible part 10A, and a hard distal end part 10C provided at a distal end of the bendable part 10B.

The bendable part 10B is configured to be bendable by a rotational movement operation of the angle knob 12. Depending on a site of the subject in which the endoscope 1 is used, the bendable part 10B can be bent in any direction and at any angle, and the distal end part 10C can be directed in a desired direction.

Figure 6:
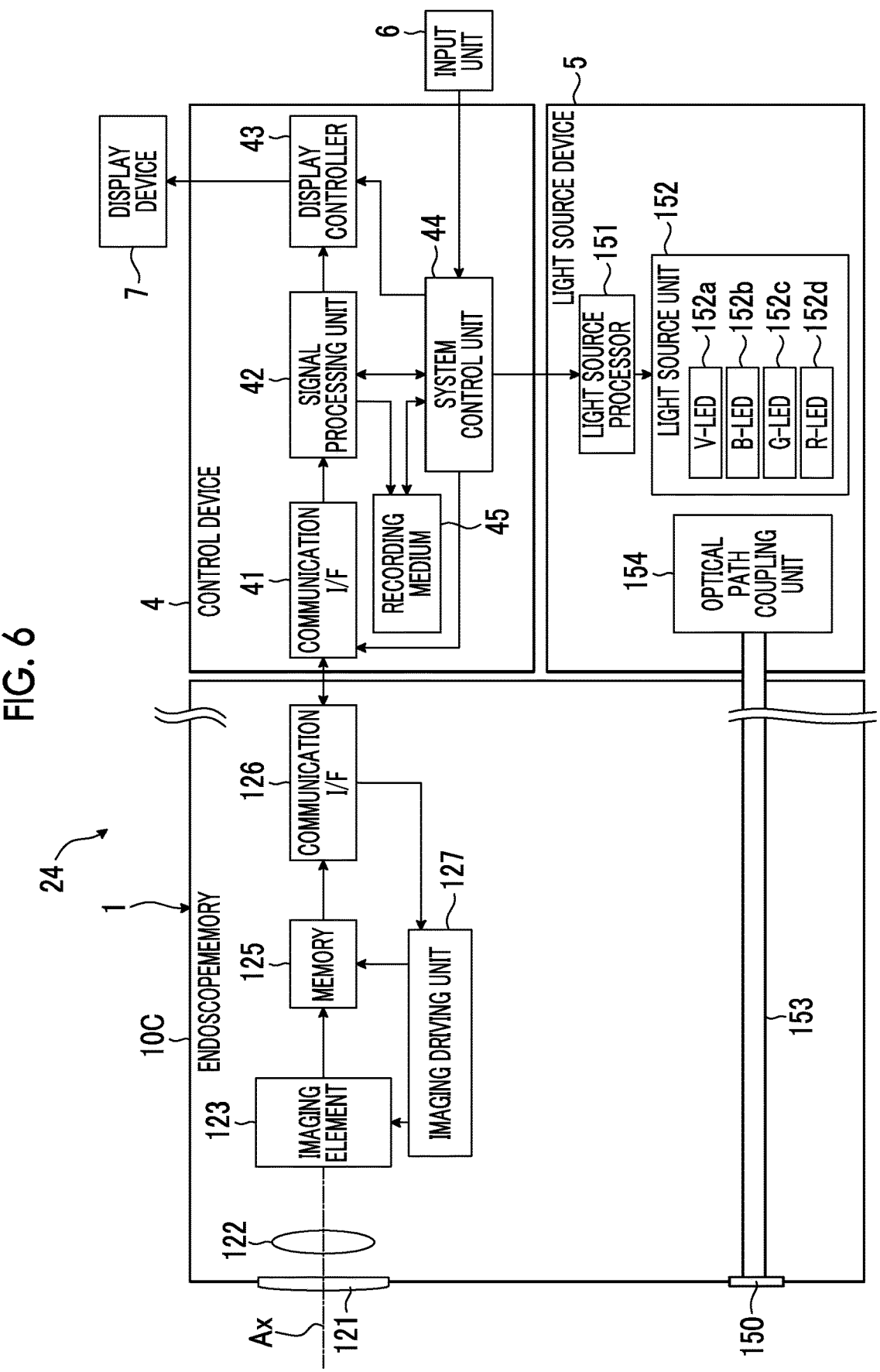
FIG. 6 is a schematic view showing an internal configuration of the endoscope apparatus 24 shown in FIG. 5.
Figure 7:
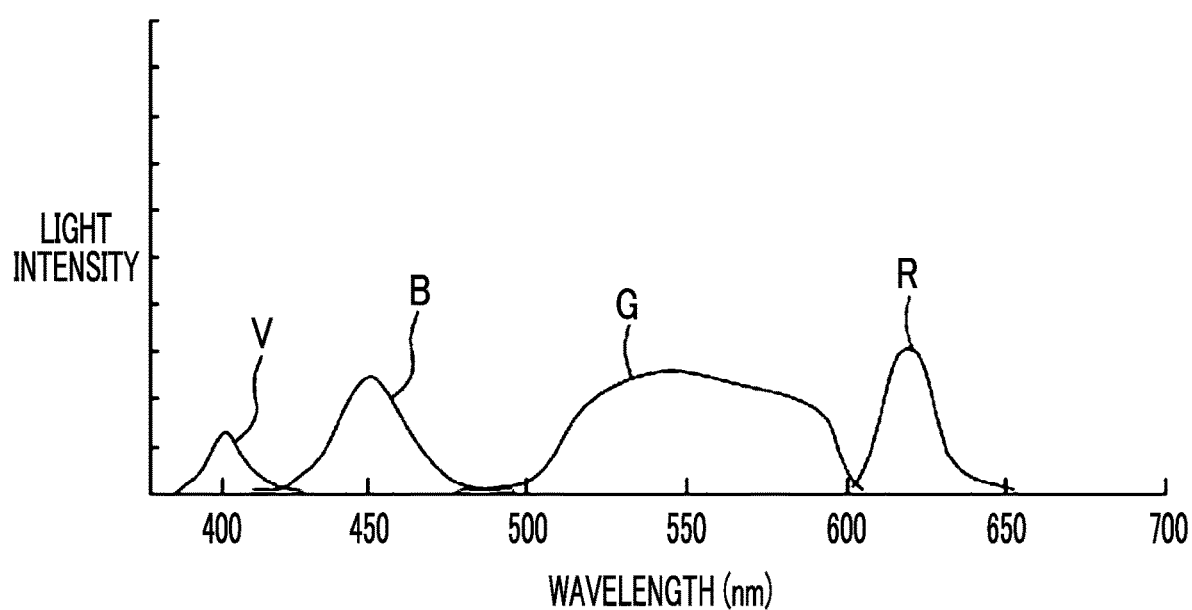
FIG. 7 is a diagram showing an example of a spectrum of light generated by a light source device 5 shown in FIG. 6.

FIG. 6 is a schematic view showing an internal configuration of the endoscope apparatus 24 shown in FIG. 5. FIG. 7 is a diagram showing an example of a spectrum of light generated by the light source device 5 shown in FIG. 6.

The light source device 5 can perform irradiation while switching normal light and special light as illumination light. The normal light is light having an emission spectrum suitable for recognition by a human, such as a doctor, such as white light. The special light is light having an emission spectrum suitable for analysis by a computer, such as image-enhanced endoscopy (IEE), which has a different emission spectrum from the normal light.

Specifically, the light source device 5 comprises a light source processor 151, a light source unit 152, and an optical path coupling unit 154. The light source processor 151 is connected to the system control unit 44 of the control device 4, and controls the light source unit 152 based on the command from a system control unit 44.

The light source unit 152 has, for example, a plurality of semiconductor light sources, each of which is turned on or off, and in a case in which the light source unit 152 is turned on, the emission amount of each semiconductor light source is controlled to emit the illumination light for illuminating an observation target. In the present embodiment, the light source unit 152 has LEDs of four colors, a violet light emitting diode (V-LED) 152a, a blue light emitting diode (B-LED) 152b, a green light emitting diode (G-LED) 152c, and a red light emitting diode (R-LED) 152d.

By independently controlling each of the V-LED 152a, the B-LED 152b, the G-LED 152c, and the R-LED 152d, the light source processor 151 can emit violet light V, blue light B, green light or red light R by independently changing a light amount. As shown in FIG. 7, the V-LED 152a generates the violet light V of which a central wavelength is in a range of 405±10 nm and a wavelength range is in a range of 380 to 420 nm. The B-LED 152b generates the blue light B of which a central wavelength is in a range of 450±10 nm and a wavelength range is in a range of 420 to 500 nm. The G-LED 152c generates the green light G of which a wavelength range is in a range of 480 to 600 nm. The R-LED 152d generates the red light R of which a central wavelength is in a range of 620 to 630 nm and a wavelength range is in a range of 600 to 650 nm.

In addition, in a case of irradiation with the normal light, the light source processor 151 controls each of the LEDs 152a to 152d to emit the white light in which a light amount ratio of the violet light V, the blue light B, the green light and the red light R is Vc:Bc:Gc:Rc. It should be noted that Vc, Bc, Gc, Rc>0.

In addition, in a case of irradiation with the special light, the light source processor 151 controls each of the LEDs 152a to 152d to emit the special light in which the light amount ratio of the violet light V, the blue light B, the green light and the red light R as short-wavelength narrow band light is Vs:Bs:Gs:Rs.

The light amount ratio Vs:Bs:Gs:Rs is different from the light amount ratio Vc:Bc:Gc:Rc used in a case of the irradiation with the normal light, and is appropriately determined in accordance with the observation purpose. For example, in a case in which superficial blood vessels are enhanced, it is preferable to make Vs larger than Bs, Gs, and Rs, and in a case in which mesopelagic blood vessels are enhanced, it is preferable to make Gs larger than Vs, Gs, and Rs.

The optical path coupling unit 154 combines each light emitted from the V-LED 152a, the B-LED 152b, the G-LED 152c, and the R-LED 152d, and emits the combined light as the illumination light. The illumination light emitted from the optical path coupling unit 154 of the light source unit 152 enters a light guide 153, which will be described below, built in the universal cord 13, and is emitted to the subject through an illumination lens 150 provided at the distal end part 10C of the insertion part 110.

In the distal end part 10C of the endoscope 1, an imaging optical system including an objective lens 121 and a lens group 122, an imaging element 123 that images the subject through the imaging optical system, a memory 125, such as the RAM, a communication interface (I/F) 126, an imaging driving unit 127, and the light guide 153 for guiding the illumination light emitted from the light source unit 152 to the illumination lens 150 are provided. The imaging element 123 constitutes an imaging unit according to the embodiment of the present invention.

The light guide 153 extends from the distal end part 10C to the connector portion 13A of the universal cord 13. The illumination light emitted from the light source unit 152 of the light source device 5 is in a state of being capable of entering the light guide 153 in a state in which the connector portion 13A of the universal cord 13 is connected to the light source device 5.

A charge coupled device (CCD) image sensor or a complementary metal oxide semiconductor (CMOS) image sensor is used as the imaging element 123. In the present embodiment, the imaging element 123 is the CMOS using a rolling shutter.

The imaging element 123 has a light-receiving surface on which a plurality of pixels are two-dimensionally arranged, and converts an optical image formed on the light-receiving surface by the imaging optical system described above into an electrical signal (imaging signal) in each pixel. Moreover, the imaging element 123 converts the converted imaging signal from an analog signal into a digital signal having a predetermined number of bits, and outputs the imaging signal converted into the digital signal to the memory 125. For example, an imaging element on which a color filter, such as an elementary color or a complementary color, is mounted, is used as the imaging element 123.

The imaging element 123 may be disposed at the distal end part 10C in a state in which the light-receiving surface is perpendicular to an optical axis Ax of the objective lens 121, or may be disposed at the distal end part 10C in a state in which the light-receiving surface is parallel to the optical axis Ax of the objective lens 121.

The imaging optical system provided in the endoscope 1 is composed of optical members (including the lens group 122 described above), such as a lens and a prism, which are present on an optical path of the light from the subject between the imaging element 123 and the objective lens 121, and the objective lens 121. There is also a case in which the imaging optical system is composed of only the objective lens 121.

The memory 125 transitorily records the digital imaging signal output from the imaging element 123.

The communication I/F 126 is connected to a communication interface (I/F) 41 of the control device 4. The communication I/F 126 transmits the imaging signal recorded in the memory 125 to the control device 4 through a signal line in the universal cord 13.

The imaging driving unit 127 is connected to the system control unit 44 of the control device 4 via the communication I/F 126. The imaging driving unit 127 drives the imaging element 123 and the memory 125 based on the command from the system control unit 44 received by the communication I/F 126.

The control device 4 comprises the communication I/F 41, which is connected to the communication I/F 126 of the endoscope 1 by the universal cord 13, a signal processing unit 42, a display controller 43, the system control unit 44, and a recording medium 45.

The communication I/F 41 receives the imaging signal transmitted from the communication I/F 126 of the endoscope 1 to transmit the imaging signal to the signal processing unit 42.

The signal processing unit 42 has a memory that transitorily records the imaging signal received from the communication I/F 41 built therein, and performs processing (image processing, such as demosaicing processing or gamma-correction processing) on the captured image signal that is a set of the imaging signals recorded in the memory to generate captured image information in such a format that recognition processing to be described below or the like can be performed. The captured image information generated by the signal processing unit 42 is recorded on the recording medium 45, such as a hard disk or a flash memory.

The display controller 43 displays a captured image based on the captured image information generated by the signal processing unit 42 on the display device 7. A coordinate of each pixel data constituting the captured image information generated by the signal processing unit 42 is managed in association with a coordinate of any of the display pixels constituting the display surface of the display device 7.

The system control unit 44 controls each unit of the control device 4, and transmits the command to the imaging driving unit 127 of the endoscope 1 and the light source processor 151 of the light source device 5, and comprehensively controls the entire endoscope apparatus 24. For example, the system control unit 44 performs the control of the imaging element 123 via the imaging driving unit 127. In addition, the system control unit 44 performs the control of the light source unit 152 via the light source processor 151.

The system control unit 44 or the signal processing unit 42 includes the various processors that execute a program to perform processing, a RAM, and a ROM.

Examples of various processors include a CPU, which is a general-purpose processor that executes the program to perform various pieces of processing, a programmable logic device, which is a processor of which the circuit configuration can be changed after the manufacture, such as an FPGA, and a dedicated electric circuit, which is a processor having the circuit configuration specially designed for executing specific processing, such as an ASIC.

More specifically, the structure of these various processors is an electric circuit in which circuit elements, such as semiconductor elements, are combined.

The system control unit 44 or the signal processing unit 42 may be composed of one of the various processors, or may be composed of a combination (for example, a combination of a plurality of FPGAs or a combination of a CPU and an FPGA) of two or more processors of the same type or different types.

Figure 8:
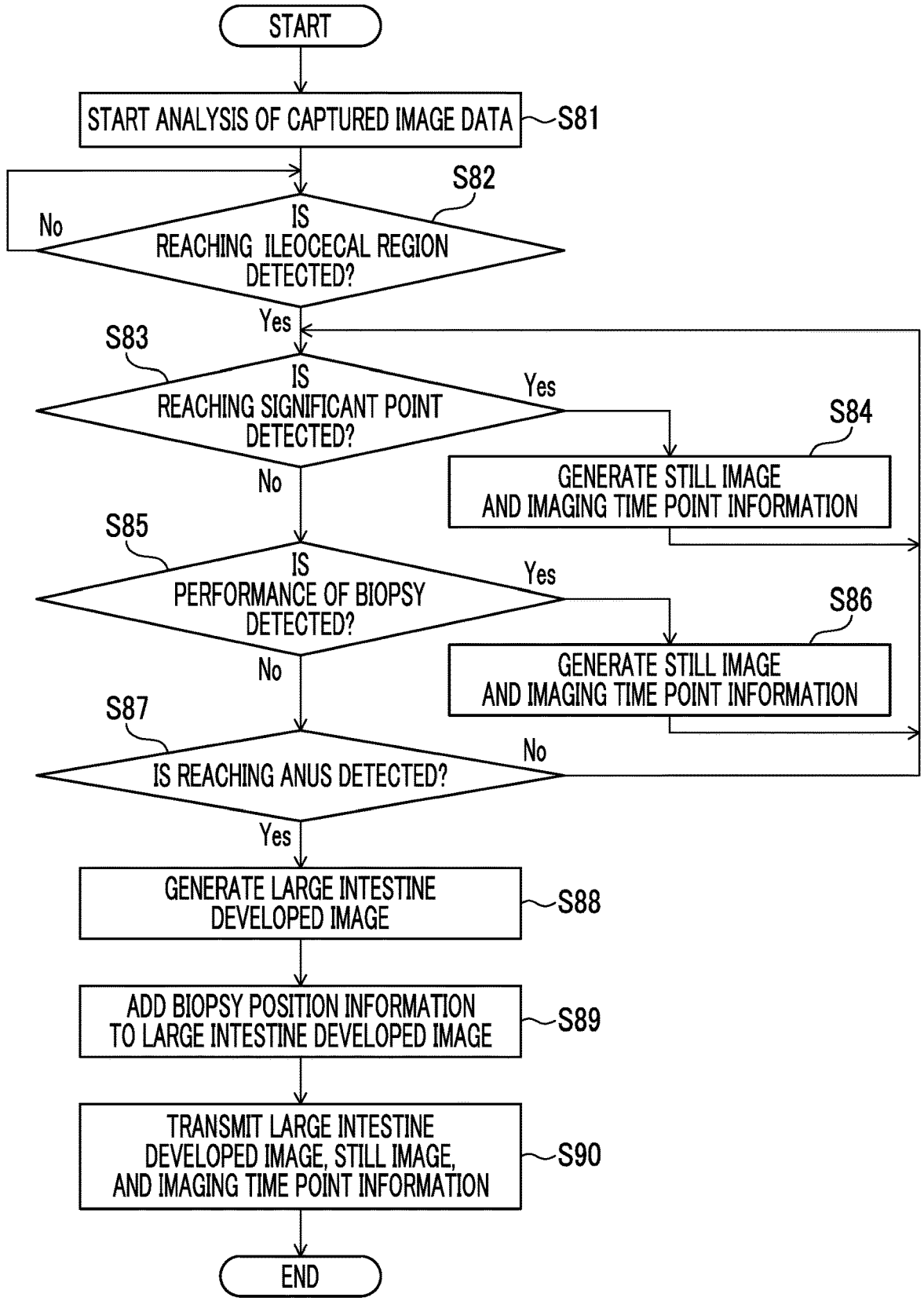
FIG. 8 is a flowchart showing an example of generation processing of a still image by an image processing device 23.

FIG. 8 is a flowchart showing an example of generation processing of the still image by the image processing device 23. The image processing device 23 to which the endoscopic examination support device according to the embodiment of the present invention is applied executes, for example, the processing shown in FIG. 8. Here, a case will be described in which a large intestine examination is performed in which the endoscope 1 (scope) is inserted from the anus in the subject to reach the ileocecal region, and then the endoscope 1 is slowly pulled out for the observation.

First, the image processing device 23 starts the analysis by the AI of the captured image data continuously input from the endoscope apparatus 24 (step S81). Specifically, the analysis is the image recognition based on the captured image data. For example, based on the image recognition, the image processing device 23 detects that the distal end of the endoscope 1 reaches the significant point or detects the performance of the biopsy by detecting the biopsy forceps reflected in the image. The significant point is a specific site in the large intestine, such as an ascending colon, a transverse colon, a descending colon, a sigmoid colon, and a rectum.

Next, the image processing device 23 determines whether or not it is detected that the distal end of the endoscope 1 reaches the ileocecal region based on a result of the analysis started in step S81 (step S82), and waits until reaching the ileocecal region is detected (step S82: No).

In step S82, in a case in which reaching the ileocecal region is detected (step S82: Yes), the image processing device 23 determines whether or not it is detected that the distal end of the endoscope 1 reaches the significant point based on the result of the analysis started in step S81 (step S83).

In step S83, reaching the significant point is detected (step S83: Yes), the image processing device 23 generates the still image based on the captured image data input from the endoscope apparatus 24 at the time point of detection, and the imaging time point information indicating the imaging time point of the captured image data (step S84), and returns to step S83. The generation of the still image and the imaging time point information in step S84 may be performed at a plurality of time points after reaching the significant point is detected.

In step S83, in a case in which reaching the significant point is not detected (step S83: No), the image processing device 23 determines whether or not the performance of the biopsy is detected based on the result of the analysis started in step S81 (step S85).

In step S85, the performance of the biopsy is detected (step S85: Yes), the image processing device 23 generates the still image based on the captured image data input from the endoscope apparatus 24 at the time of detection, and the imaging time point information indicating the imaging time point of the captured image data (step S86), and returns to step S83. The generation of the still image and the imaging time point information in step S86 may be performed at a plurality of time points after the performance of the biopsy is detected.

In step S85, in a case in which the performance of the biopsy is not detected (step S85: No), the image processing device 23 determines whether or not it is detected that the distal end of the endoscope 1 reaches the anus based on the result of the analysis started in step S81 (step S87). In a case in which reaching the anus is not detected (step S87: No), the image processing device 23 returns to step S83.

In step S87, in a case in which reaching the anus is detected (step S87: Yes), the image processing device 23 generates a large intestine developed image based on the plurality of captured image data input from the endoscope apparatus 24 (step S88). This large intestine developed image virtually represents a state in which the large intestine of the subject is cut open along an extension direction and developed, and can be generated by synthesizing a plurality of still images based on the images obtained by imaging an inside of the large intestine. A specific example of the large intestine developed image will be described with reference to FIG. 9.

For example, the image processing device 23 generates the large intestine developed image based on the still images generated in steps S84 and S86. Alternatively, the image processing device 23 may generate the large intestine developed image based on at least a part of the captured image data input from the endoscope apparatus 24 in a period from when it is detected that the distal end of the endoscope 1 reaches the ileocecal region to when it is detected that the distal end of the endoscope 1 reaches the anus. That is, the image processing device 23 may generate the still image for generating the large intestine developed image based on the captured image data acquired from the endoscope apparatus 24 separately from the still images generated in steps S84 and S86.

Next, the image processing device 23 adds biopsy position information indicating the position at which the biopsy is performed to the large intestine developed image generated in step S88 (step S89). The biopsy position information is, for example, an image indicating the position at which the biopsy is performed in the large intestine developed image. A specific example of the biopsy position information will be described with reference to FIG. 9.

Next, the image processing device 23 transmits the large intestine developed image added with the biopsy position information in step S89, the still image and the imaging time point information generated in steps S84 and S86 to the endoscope department server 21 (step S90), a series of processing ends. As a result, the large intestine developed image or the like generated by the image processing device 23 can be displayed on a display device of another device (for example, the display unit 22b of the client PC 22).

That is, these pieces of information transmitted to the endoscope department server 21 in step S90 are stored by the medical image storage system 40 shown in FIG. 1, and are displayed by, for example, the client PC 22. A specific example of the display by the client PC 22 will be described with reference to FIG. 9.

Figure 9:
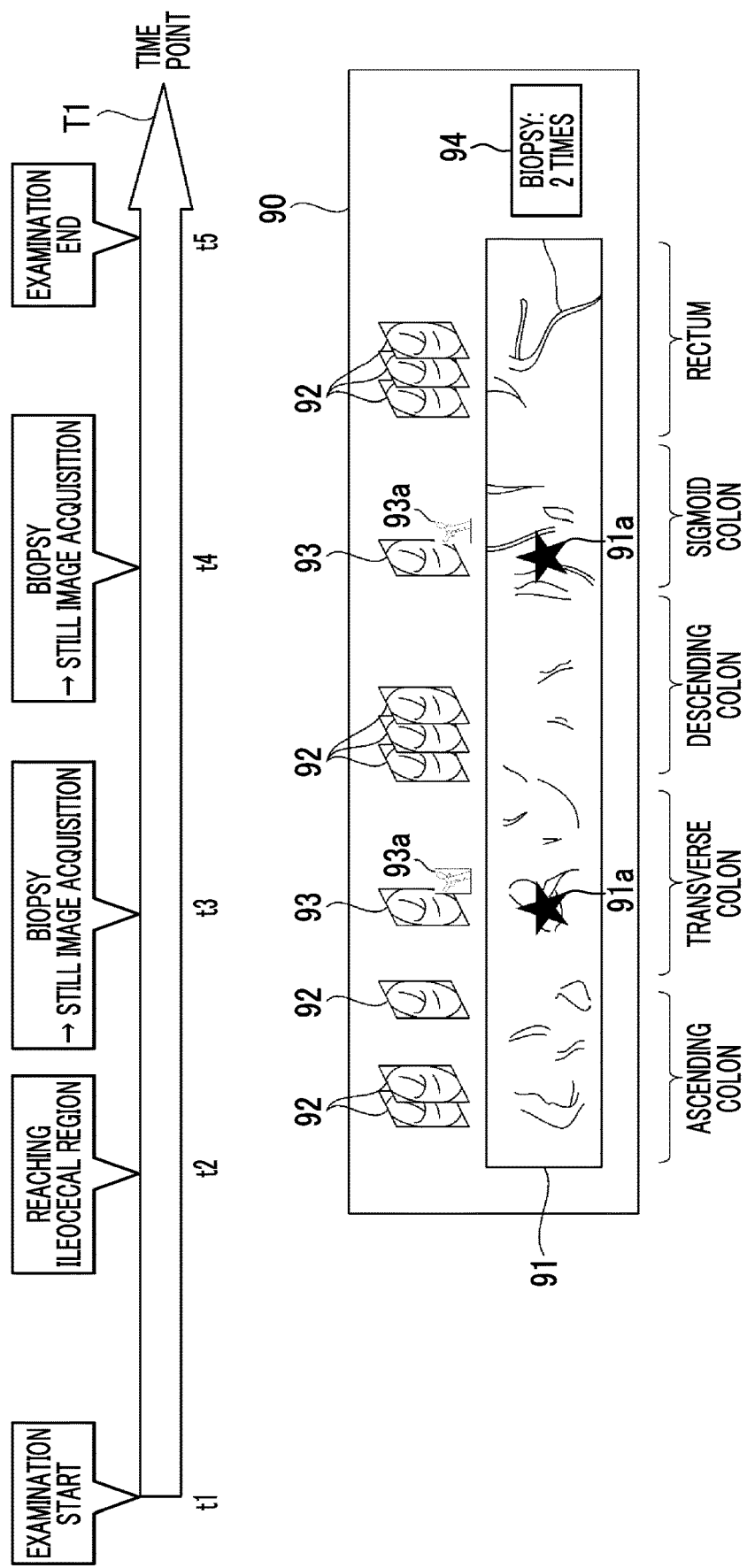
FIG. 9 is a diagram showing an example of an endoscopic examination and a large intestine developed image.

FIG. 9 is a diagram showing an example of the endoscopic examination and the large intestine developed image. In FIG. 9, a horizontal axis T1 shows a time series from the start to the end of the endoscopic examination.

As shown on the horizontal axis T1, in the example shown in FIG. 9, the insertion of the distal end of the endoscope 1 into the subject is started at a time point t1 (examination is started). In addition, at a time point t2 after the time point t1, the distal end of the endoscope 1 reaches the ileocecal region of the subject (reaching the ileocecal region).

After the time point t2, the observation is performed while pulling out the distal end of the endoscope 1 from the subject. Moreover, the biopsy is performed by using the biopsy forceps of the endoscope 1 at each of a time point t3 after the time point t2 and a time point t4 after the time point t3.

At the time point t3, the image processing device 23 detects the performance of the biopsy by recognizing the reflection of the biopsy forceps based on the captured image data from the endoscope apparatus 24. Moreover, the image processing device 23 automatically acquires the still image at the time point t3 based on the detection result.

Similarly, at the time point t4, the image processing device 23 detects the performance of the biopsy by recognizing the reflection of the biopsy forceps based on the captured image data from the endoscope apparatus 24. Moreover, the image processing device 23 automatically acquires the still image at the time point t4 based on the detection result.

In addition, at a time point t5 after the time point t4, the distal end of the endoscope 1 reaches the anus of the subject, and the endoscope 1 is removed from the subject (examination ends).

In addition, the image processing device 23 also generates the still image in a case in which it is detected that the distal end of the endoscope 1 reaches the significant point in the large intestine based on the captured image data from the endoscope apparatus 24, in addition to a case in which the performance of the biopsy is detected.

In addition, the image processing device 23 adds, to the generated still image, imaging time point information indicating an internal time point of the image processing device 23 when the still image is obtained.

In addition, the image processing device 23 generates the large intestine developed image based on the captured image data obtained from the endoscope apparatus 24, and adds the biopsy position information to the generated large intestine developed image.

The still image, the imaging time point information, and the large intestine developed image generated by the image processing device 23 are stored by the medical image storage system 40 as described above.

Thereafter, for example, in a case in which an instruction (for example, the button C1 of "image display" shown in FIG. 4 is pressed) to display the image for the endoscopic examination shown in FIG. 9 is received in the client PC 22, the client PC 22 displays an image 90 shown in FIG. 9 on the display unit 22b based on the still image, the imaging time point information, and the large intestine developed image stored by the medical image storage system 40.

The image 90 includes a large intestine developed image 91, a thumbnail 92, a thumbnail 93, a biopsy mark 93a, a biopsy position mark 91a, and a biopsy number notification portion 94.

The large intestine developed image 91 is, for example, the large intestine developed image generated by the image processing device 23 in step S88 of FIG. 8. For example, the image processing device 23 generates the large intestine developed image 91 by and synthesizing the generated still images while superimposing the portions overlapping with each other.

For example, the large intestine developed image 91 is the developed image obtained by synthesizing the still images based on the captured image data having the imaging time point from the time point t2 to the time point t5. In FIG. 9, a left end of the large intestine developed image 91 is a portion captured at the time point t2, and a right end of the large intestine developed image 91 is a portion captured at the time point t5. Specifically, the large intestine developed image 91 has each region of the ascending colon, the transverse colon, the descending colon, the sigmoid colon, and the rectum in order from the left end.

The biopsy position mark 91a is an example of the biopsy position information added to the large intestine developed image by the image processing device 23 in step S89 shown in FIG. 8, for example. For example, based on the imaging time point information of each still image used for the generation of the large intestine developed image 91, the image processing device 23 superimposes the biopsy position mark 91a on the portion of the large intestine developed image 91 captured at the time point when the performance of the biopsy is detected. As a result, the biopsy position mark 91a is added to the position of the large intestine developed image 91 at which the biopsy is performed.

The thumbnail 92 is, for example, the thumbnail (reduced image) of the still image generated by the image processing device 23 together with the imaging time point information in step S84 of FIG. 8. The thumbnail 93 is, for example, the thumbnail of the still image generated by the image processing device 23 together with the imaging time point information in step S86 of FIG. 8.

By using each of the thumbnails 92 and 93 as a target, for example, based on the imaging time point information of each still image used for the generation of the large intestine developed image 91, the image processing device 23 specifies the portion of the large intestine developed image 91 captured at the time point when the still image corresponding to the target thumbnail is captured, and disposes a target still image on an upper side of the specified portion. As a result, the image 90 including thumbnails 92 and 93 associated with the large intestine developed image 91 in accordance with the imaging time point is generated.

In a case in which a selection operation (for example, clicking the thumbnails 92 and 93) for selecting any of the displayed thumbnail 92 or thumbnail 93 is received, the client PC 22 displays, on the display unit 22b, the still image corresponding to the thumbnail among the thumbnails 92 and 93 for which the selection operation is received. The still image corresponding to the thumbnail may be displayed while being superimposed on the image 90, may be displayed instead of the image 90, or may be displayed side by side with the image 90.

In addition, among the thumbnails 92 and 93, the thumbnail 93 of the still image obtained in accordance with the detection of the performance of the biopsy may be added with the biopsy mark 93a indicating that the still image is the still image during the performance of the biopsy. As a result, it is possible to easily grasp that the thumbnail 93 among the thumbnails 92 and 93 corresponds to the still image during the performance of the biopsy.

In addition, the client PC 22 may display the number of performed biopsies (for example, the number of thumbnails 93) on the biopsy number notification portion 94. In the example shown in FIG. 9, since the performance of the biopsy is detected at the time points t3 and t4, the client PC 22 displays 2 times (biopsy: 2 times) in the biopsy number notification portion 94 as the number of performed biopsies.

As described above, with the image processing device 23 to which the endoscopic examination support device according to the embodiment of the present invention is applied, based on the plurality of captured image data obtained by a plurality of imagings by the endoscope 1 in a state in which the endoscope 1 is inserted into the subject, and the treatment information indicating the treatment performed by using the endoscope 1 in the state, the developed image of the inside of the subject obtained by synthesizing the plurality of captured image data, which is the developed image added with the information indicating the position in the subject at which the treatment is performed, can be displayed on the client PC 22.

As a result, it is possible for the user who sees the developed image to easily grasp the state of the inner surface of the subject into which the endoscope 1 is inserted. Further, since the information indicating the position in the subject at which the treatment is performed is added to the developed image, it is possible to easily grasp the position at which the treatment, such as the biopsy, is performed in the endoscopic examination.

Modification Example

The configuration has been described in which each information generated by the image processing device 23 is stored in the medical image storage system 40 and the client PC 22 displays the image 90 or the like based on each information stored by the medical image storage system 40, but the configuration is not limited to this configuration. For example, each information generated by the image processing device 23 may be stored in the endoscope department server 21, and the client PC 22 may display the image 90 or the like based on each information stored by the endoscope department server 21.

In addition, although the configuration has been described in which the developed image is displayed on the display unit 22b of the client PC 22, the configuration is not limited to such a configuration. For example, a configuration may be adopted in which the developed image is displayed on the display device 7 of the endoscope apparatus 24 or another display device (not shown).

In addition, as a specific example of the treatment using the endoscope 1, the biopsy using the biopsy forceps of the endoscope 1 has been described, but the treatment using the endoscope 1 is not limited to this. For example, the treatment using the endoscope 1 may be excision of a polyp and the like.

In addition, although the large intestine developed image has been described as an example of the developed image, the developed image is not limited to this. For example, in a case in which the examination of a stomach of the subject is performed by the endoscope apparatus 24, a stomach developed image that virtually represents a state in which the stomach of the subject is cut open along the extension direction and developed is displayed.

Although the configuration has been described in which the endoscopic examination support device according to the embodiment of the present invention is applied to the image processing device 23, the endoscopic examination support device according to the embodiment of the present invention can also be applied to a device other than the image processing device 23. For example, the endoscopic examination support device according to the embodiment of the present invention can also be applied to the endoscope apparatus 24, the endoscope department server 21, the medical image storage system 40, and the like.

As described above, in the present specification, the following matters are disclosed.

(1) An endoscopic examination support device comprising a processor, and a memory, in which the memory stores a plurality of pieces of captured image data obtained by a plurality of imagings by an endoscope in a state in which the endoscope is inserted into a subject, and treatment information indicating treatment performed by using the endoscope in the state, and the processor is configured to generate, based on the plurality of pieces of captured image data and the treatment information a developed image of an inside of the subject obtained by synthesizing the plurality of pieces of captured image data, the developed image being added with information indicating a position in the subject at which the treatment is performed, and display the generated developed image on a display device.

(2) The endoscopic examination support device according to (1), in which the memory stores a still image obtained by an imaging by the endoscope, and the processor generates the developed image associated with the still image.

(3) The endoscopic examination support device according to (2), in which the still image includes a still image obtained in accordance with a detection result of the treatment using the endoscope based on the plurality of pieces of captured image data.

(4) The endoscopic examination support device according to (2) or (3), in which the still image includes a still image obtained in accordance with a detection result indicating that a distal end part of the endoscope reaches a specific site in the subject based on the plurality of pieces of captured image data.

(5) The endoscopic examination support device according to any one of (1) to (4), in which the plurality of pieces of captured image data are a plurality of pieces of captured image data obtained after it is detected that a distal end part of the endoscope reaches an end part of an examination region in the subject.

(6) The endoscopic examination support device according to any one of (1) to (5), in which the memory stores the plurality of pieces of captured image data and the treatment information in association with time point information, and the processor generates the developed image added with the information indicating the position in the subject at which the treatment is performed, based on the time point information.

(7) The endoscopic examination support device according to any one of (1) to (5), in which the processor generates the developed image added with the information indicating the position in the subject at which the treatment is performed, based on a detection result of performing the treatment using the endoscope based on the plurality of pieces of captured image data.

(8) An endoscopic examination support method comprising storing a plurality of pieces of captured image data obtained by a plurality of imagings by an endoscope in a state in which the endoscope is inserted into a subject, and treatment information indicating treatment performed by using the endoscope in the state, generating, based on the plurality of captured image data and the treatment information a developed image of an inside of the subject obtained by synthesizing the plurality of pieces of captured image data, the developed image being added with information indicating a position in the subject at which the treatment is performed, and displaying the generated developed image on a display device.

(9) An endoscopic examination support program causing a computer to execute a process comprising storing a plurality of pieces of captured image data obtained by a plurality of imagings by an endoscope in a state in which the endoscope is inserted into a subject, and treatment information indicating treatment performed by using the endoscope in the state, generating, based on the plurality of captured image data and the treatment information a developed image of an inside of the subject obtained by synthesizing the plurality of pieces captured image data, the developed image being added with information indicating a position in the subject at which the treatment is performed, and displaying the generated developed image on a display device.

Various embodiments have been described above with reference to the drawings, but it is needless to say that the present invention is not limited to this. It is obvious that those skilled in the art can conceive various change examples or modification examples within the scope described in the claims, and naturally, such change examples or modification examples also belong to the technical scope of the present invention. In addition, the components in the embodiments described above may be optionally combined without departing from the gist of the invention.

It should be noted that the present application is based on Japanese Patent Application filed on Feb. 27, 2020 (JP2020-032313), the contents of which are incorporated herein by reference.

EXPLANATION OF REFERENCES

1: endoscope
4: control device
5: light source device
6, 22a: input unit
7: display device
10: HIS
10A: flexible part
10B: bendable part
10C: distal end part
11: operating part
12: angle knob
13: universal cord
13A: connector portion
13B: connector portion
20: endoscope department system
20A: reception
20B: pretreatment room
20C: examination room
20D: washing room
20E: conference room
21: endoscope department server
22: client PC
22b: display unit
22c: recording unit
22d: transmission/reception unit
22e: control unit
23: image processing device
24: endoscope apparatus
25: washing management device
26: washing machine
27: in-department LAN
30: pathology department system
40: medical image storage system
41, 126: communication I/F
42: signal processing unit
43: display controller
44: system control unit
45: recording medium
50: different-department system
60: in-hospital LAN
90: image
91: large intestine developed image
91a: biopsy position mark
92, 93: thumbnail
93a: biopsy mark
94: biopsy number notification portion
110: insertion part
121: objective lens
122: lens group
123: imaging element
125: memory
127: imaging driving unit
150: illumination lens
151: light source processor
152: light source unit
152a: V-LED
152b: B-LED
152c: G-LED
152d: R-LED
153: light guide
154: optical path coupling unit
t1 to t5: time point
C1: button

What is claimed is:

1. An endoscopic examination support device comprising:
a processor; and
a memory, wherein the memory stores a plurality of pieces of captured image data obtained by a plurality of imagings by an endoscope in a state in which the endoscope is inserted into a subject, and treatment information regarding treatment performed by using the endoscope to an inside of the subject in the state, the treatment information including information indicating a position at which the treatment is performed, and
the processor is configured to
generate, based on the plurality of pieces of captured image data and the treatment information, a developed image of the inside of the subject obtained by synthesizing the plurality of pieces of captured image data, the developed image being added with information indicating the position in the subject at which the treatment is performed, and
display the generated developed image on a display device.

2. The endoscopic examination support device according to claim 1,
wherein the memory stores a still image obtained by an imaging by the endoscope, and
the processor generates the developed image associated with the still image.

3. The endoscopic examination support device according to claim 2,
wherein the still image includes a still image obtained in accordance with a detection result of the treatment using the endoscope based on the plurality of pieces of captured image data.

4. The endoscopic examination support device according to claim 2,
wherein the still image includes a still image obtained in accordance with a detection result based on the plurality of pieces of captured image data indicating that a distal end part of the endoscope reaches a specific site in the subject.

5. The endoscopic examination support device according to claim 3,
wherein the still image includes a still image obtained in accordance with a detection result based on the plurality of pieces of captured image data indicating that a distal end part of the endoscope reaches a specific site in the subject.

6. The endoscopic examination support device according to claim 1,
wherein the plurality of pieces of captured image data are a plurality of pieces of captured image data obtained after it is detected that a distal end part of the endoscope reaches an end part of an examination region in the subject.

7. The endoscopic examination support device according to claim 2,
wherein the plurality of pieces of captured image data are a plurality of pieces of captured image data obtained after it is detected that a distal end part of the endoscope reaches an end part of an examination region in the subject.

8. The endoscopic examination support device according to claim 3,
wherein the plurality of pieces of captured image data are a plurality of pieces of captured image data obtained after it is detected that a distal end part of the endoscope reaches an end part of an examination region in the subject.

9. The endoscopic examination support device according to claim 4,
wherein the plurality of pieces of captured image data are a plurality of pieces of captured image data obtained after it is detected that the distal end part of the endoscope reaches an end part of an examination region in the subject.

10. The endoscopic examination support device according to claim 5,
wherein the plurality of pieces of captured image data are a plurality of pieces of captured image data obtained after it is detected that the distal end part of the endoscope reaches an end part of an examination region in the subject.

11. The endoscopic examination support device according to claim 1,
wherein the memory stores the plurality of pieces of captured image data and the treatment information in association with time point information, and
the processor generates the developed image added with the information indicating the position in the subject at which the treatment is performed, based on the time point information.

12. The endoscopic examination support device according to claim 1,
wherein the processor generates the developed image added with the information indicating the position in the subject at which the treatment is performed, based on a detection result of performing the treatment using the endoscope based on the plurality pf pieces of captured image data.

13. An endoscopic examination support method comprising:
storing a plurality of pieces of captured image data obtained by a plurality of imagings by an endoscope in a state in which the endoscope is inserted into a subject, and treatment information regarding treatment performed by using the endoscope to an inside of the subject in the state, the treatment information including information indicating a position at which the treatment is performed;
generating, based on the plurality of pieces of captured image data and the treatment information, a developed image of the inside of the subject obtained by synthesizing the plurality of pieces of captured image data, the developed image being added with information indicating the position in the subject at which the treatment is performed; and
displaying the generated developed image on a display device.

14. A non-transitory computer readable medium storing an endoscopic examination support program causing a computer to execute a process comprising:
storing a plurality of pieces of captured image data obtained by a plurality of imagings by an endoscope in a state in which the endoscope is inserted into a subject, and treatment information regarding treatment performed by using the endoscope to an inside of the subject in the state, the treatment information including information indicating a position at which the treatment is performed;
generating, based on the plurality of pieces of captured image data and the treatment information, a developed image of the inside of the subject obtained by synthesizing the plurality of pieces of captured image data, the developed image being added with information indicating the position in the subject at which the treatment is performed; and
displaying the generated developed image on a display device.

15. The endoscopic examination support device according to claim 1,
wherein the treatment information includes a mark indicating a position at which biopsy is performed.

* * * * *